(12) United States Patent
Goto

(10) Patent No.: US 11,435,014 B2
(45) Date of Patent: Sep. 6, 2022

(54) THREADED CONNECTION FOR PIPES OR TUBES AND METHOD FOR PRODUCING THE THREADED CONNECTION FOR PIPES OR TUBES

(71) Applicants: Nippon Steel Corporation, Tokyo (JP); Vallourec Oil and Gas France, Aulnoye-Aymeries (FR)

(72) Inventor: Kunio Goto, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 0 days.

(21) Appl. No.: 16/613,452

(22) PCT Filed: Apr. 24, 2018

(86) PCT No.: PCT/JP2018/016582
§ 371 (c)(1),
(2) Date: Nov. 14, 2019

(87) PCT Pub. No.: WO2018/216416
PCT Pub. Date: Nov. 29, 2018

(65) Prior Publication Data
US 2020/0166163 A1 May 28, 2020

(30) Foreign Application Priority Data
May 22, 2017 (JP) .............................. JP2017-100546

(51) Int. Cl.
*F16L 15/04* (2006.01)
*C10M 103/02* (2006.01)
(Continued)

(52) U.S. Cl.
CPC ........... *F16L 15/04* (2013.01); *C10M 103/02* (2013.01); *C10M 107/38* (2013.01);
(Continued)

(58) Field of Classification Search
CPC .............. C10M 103/02; C10M 107/38; C10M 125/10; C10M 145/04; C10M 145/20;
(Continued)

(56) References Cited

U.S. PATENT DOCUMENTS 5,866,518 A   2/1999  Dellacorte et al.
8,409,718 B2  4/2013  Goto et al.
(Continued)

FOREIGN PATENT DOCUMENTS

CN   1407073 A    4/2003
CN   101125995 A  2/2008
(Continued)

OTHER PUBLICATIONS

Liang, S.T, Zhang, H-L., Luo, M.-T., Luo, K.-J., Li, P., Xu, H-B., Zhang, Y., "Colour performance investigation of a Cr2O3 green pigment prepared via the thermal decomposition of CrOOH", Ceramics International, 2014, 40, 4367-4373 (Year: 2014).*
(Continued)

*Primary Examiner* — James C Goloboy
(74) *Attorney, Agent, or Firm* — Banner & Witcoff, Ltd.

(57) ABSTRACT

This invention provides a threaded connection for pipes or tubes having high over-torque performance, and a method for producing the threaded connection for pipes or tubes. A threaded connection for pipes or tubes according to the present embodiment includes a pin and a box. The pin and the box include a contact surface including a threaded portion and a metal contact portion. The threaded connection for pipes or tubes includes a solid lubricant coating layer on at least one of the contact surfaces of the pin and the box, the solid lubricant coating layer including a resin, a solid lubricant powder, and $Cr_2O_3$.

4 Claims, 7 Drawing Sheets

(51) Int. Cl.

| | | |
|---|---|---|
| *C10M 107/38* | (2006.01) | |
| *C10M 125/10* | (2006.01) | |
| *C10M 145/04* | (2006.01) | |
| *C10M 145/20* | (2006.01) | |
| *C10M 149/18* | (2006.01) | |
| *F16L 58/18* | (2006.01) | |
| *C10N 50/00* | (2006.01) | |
| *C10N 10/12* | (2006.01) | |
| *C23C 28/02* | (2006.01) | |

(52) U.S. Cl.
CPC ........ *C10M 125/10* (2013.01); *C10M 145/04* (2013.01); *C10M 145/20* (2013.01); *C10M 149/18* (2013.01); *F16L 58/182* (2013.01); *C10M 2201/086* (2013.01); *C10N 2010/12* (2013.01); *C10N 2050/015* (2020.05); *C23C 28/021* (2013.01)

(58) Field of Classification Search
CPC .......... C10M 149/18; C10M 2201/086; C10N 2010/12; C10N 2050/15; C23C 28/00; C23C 28/021; F16L 15/00; F16L 15/001; F16L 15/04; F16L 58/182
See application file for complete search history.

(56) References Cited

U.S. PATENT DOCUMENTS

| | | | |
|---|---|---|---|
| 9,187,831 B2 | 11/2015 | Ochiai et al. | |
| 2004/0198909 A1* | 10/2004 | Breitscheidel | .......... C08L 81/02 |
| | | | 525/165 |
| 2007/0003693 A1 | 1/2007 | Lee et al. | |
| 2008/0257461 A1* | 10/2008 | Son | .......... C22C 38/06 |
| | | | 148/651 |
| 2015/0192229 A1* | 7/2015 | Goto | ....... F16L 15/00 |
| | | | 285/94 |

FOREIGN PATENT DOCUMENTS

| | | |
|---|---|---|
| EP | 1736697 A1 | 12/2006 |
| JP | S54-63135 A | 5/1979 |
| JP | 2008-13560 A | 1/2008 |
| JP | 2015-506445 A | 3/2015 |
| JP | 5722752 B2 | 5/2015 |
| JP | 2016-130311 A | 7/2016 |
| JP | 2017-47418 A | 3/2017 |
| WO | 2014042144 A1 | 3/2014 |

OTHER PUBLICATIONS

Jun. 26, 2018 (WO) Interntional Search Report Application No. PCT/JP2018/016582.
English Abstract of WO2014-042144.

* cited by examiner

THREADED CONNECTION FOR PIPES OR TUBES AND METHOD FOR PRODUCING THE THREADED CONNECTION FOR PIPES OR TUBES

TECHNICAL FIELD

The present invention relates to a threaded connection for pipes or tubes and a method for producing the threaded connection for pipes or tubes, and more particularly to a threaded connection for oil country tubular goods and a method for producing the threaded connection for oil country tubular goods.

BACKGROUND ART

Oil well pipes are used for drilling of oil fields and natural gas fields. Oil well pipes are formed by coupling a plurality of steel pipes in accordance with the depth of the well. Connection of steel pipes can be carried out by fastening threaded connection for pipes or tubes formed at ends of the two steel pipes. Oil well pipes are lifted and loosened for inspection and the like, and then refastened after being inspected, and reused.

Threaded connection for pipes or tubes include a pin and a box. The pin includes a male threaded portion and an unthreaded metal contact portion formed in the outer peripheral surface at the end of the pipe. The box includes a female threaded portion and an unthreaded metal contact portion formed in the inner peripheral surface at the end of the pipe. The threaded portions and unthreaded metal contact portions of the pin and the box repeatedly experience strong friction during fastening and loosening of the pipes. If these portions are not sufficiently resistant to friction, galling (uncorrectable seizure) will occur during repeated fastening and loosening. Thus, it is necessary that threaded connection for pipes or tubes have sufficient resistance to friction, i.e., excellent galling resistance.

Heretofore, heavy metal-containing compound greases, referred to as dopes, have been used to improve the galling resistance. Application of a compound grease to the surface of a threaded connection for pipes or tubes can improve the galling resistance of the threaded connection for pipes or tubes. However, heavy metals contained in compound greases, such as Pb, Zn, and Cu, may affect the environment. For this reason, practical application of a compound grease-free threaded connection for pipes or tubes is desired.

International Application Publication No. 2014/042144 (Patent Literature 1) proposes a threaded connection for pipes or tubes that does not include a compound grease but has excellent galling resistance.

A composition for solid lubricant coating layer formation described in Patent Literature 1 is a composition that contains, in a mixed solvent including water and a dipolar aprotic solvent, a powdery organic resin which is at least partially soluble in the dipolar aprotic solvent. In the composition for solid lubricant coating layer formation of Patent Literature 1, the powdery organic resin is present in a dissolved state or a dispersed state in the mixed solvent. According to Patent Literature 1, this configuration makes it possible, without using a compound grease, to inhibit formation of rust and have excellent galling resistance.

CITATION LIST

Patent Literature

Patent Literature 1: International Application Publication No. WO2014/042144

SUMMARY OF INVENTION

Technical Problem

In this connection, the threaded portions and unthreaded metal contact portions of the pin and box include metal seal portions and shoulder portions. During fastening of a threaded connection for pipes or tubes, the shoulder portions of the pin and box come in contact with each other. Torque that arises at that time is called "shouldering torque". During fastening of a threaded connection for pipes or tubes, after the shouldering torque is reached, fastening is continued until fastening is completed. By this means, the gas tightness of the threaded connection for pipes or tubes is enhanced. If fastening proceeds further, metal constituting at least one of the pin and the box starts to undergo a plastic deformation. The torque at such time is referred to as "yield torque".

The torque when fastening is completed (hereunder, referred to as "fastening torque") is set so that a sufficient seal interfacial pressure is obtained irrespective of the size of the thread interference amount. If there is a sufficient difference between the shouldering torque and the yield torque (hereunder, this difference is referred to as "torque on shoulder resistance $\Delta T\square$"), the range of the fastening torque widens. As a result, the fastening torque is adjusted easily. Therefore, it is necessary that, in addition to the aforementioned galling resistance, a threaded connection for pipes or tubes also has a high torque on shoulder resistance $\Delta T\square$, that is, high over-torque performance.

In Patent Literature 1, because the torque on shoulder resistance $\Delta T\square$ is not taken into consideration, the over-torque performance is low in some cases.

An objective of the present invention is to provide a threaded connection for pipes or tubes that has high over-torque performance, and a method for producing the threaded connection for pipes or tubes.

Solution to Problem

The threaded connection for pipes or tubes according to the present embodiment is a threaded connection that is for pipes or tubes and that includes a pin and a box. The pin and the box each include a contact surface that includes a threaded portion and an unthreaded metal contact portion. The threaded connection for pipes or tubes includes a solid lubricant coating layer on at least one of the contact surfaces of the pin and the box. The aforementioned solid lubricant coating layer contains a resin, a solid lubricant powder and $Cr_2O_3$.

A method according to the present embodiment for producing the threaded connection for pipes or tubes includes forming the above-mentioned solid lubricant coating layer on at least one of the contact surfaces of the above-mentioned pin and the above-mentioned box.

Advantageous Effects of Invention

A threaded connection for pipes or tubes according to the present embodiment includes a solid lubricant coating layer. The solid lubricant coating layer contains $Cr_2O_3$. Therefore, the threaded connection for pipes or tubes according to the present embodiment has high over-torque performance.

DESCRIPTION OF EMBODIMENTS

The present embodiment will be described in detail below with reference to the drawings. The same reference symbols will be used throughout the drawings to refer to the same or like parts, and description thereof will not be repeated.

The present inventors conducted various studies regarding the relation between a threaded connection for pipes or tubes, over-torque performance and galling resistance. As a result, the present inventors obtained the following findings.

[Over-Torque Performance]

Figure 1:
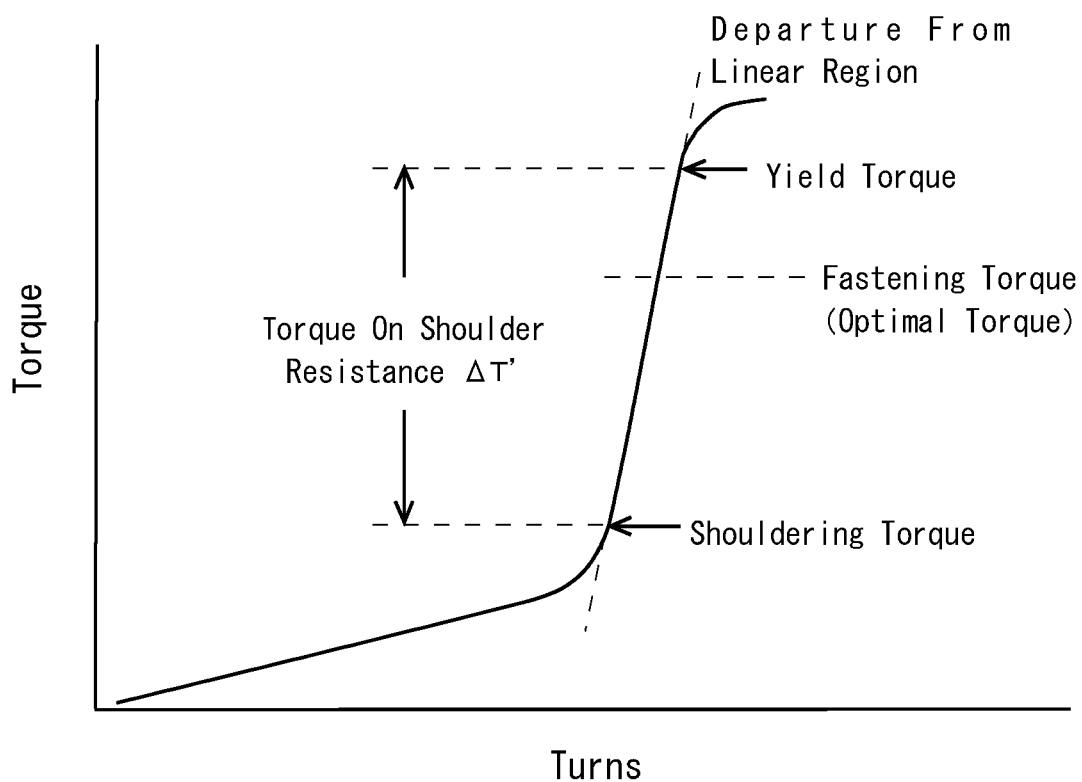
FIG. 1 is a graph illustrating the relation between the number of turns of a threaded connection for pipes or tubes and the torque.

During fastening of steel pipes to each other, the optimal torque to end the fastening is determined in advance. FIG. 1 is a graph illustrating the relation between the number of turns of steel pipes and the torque during fastening of threaded connections for pipes or tubes that have a shoulder portion. Referring to FIG. 1, fastening of the threaded connections for pipes or tubes initially increases the torque in proportion to the number of turns. The rate of increase in the torque at such time is low. As fastening continues, the shoulder portions come in contact with each other. The torque at such time is referred to as "shouldering torque". After the shouldering torque is reached, when fastening is continued, the torque again increases in proportion to the number of turns. The rate of increase in the torque at such time is high. The fastening is completed at a time point at which the torque reaches a predetermined numerical value (fastening torque). If the torque during fastening reaches the fastening torque, the metal seal portions interfere with each other with an appropriate interfacial pressure. In this case, the gas tightness of the threaded connections for pipes or tubes increases.

If fastening is further continued after the fastening torque is reached, the torque becomes too high. If the torque becomes too high, a part of the pin and the box undergoes a plastic deformation. The torque at such time is referred to as "yield torque". When the torque on shoulder resistance $\Delta T\square$ which is the difference between the shouldering torque and the yield torque is large, a margin can be provided with respect to the range of the fastening torque. As a result, it is easy to adjust the fastening torque. Therefore, a higher value for the torque on shoulder resistance $\Delta T\square$ is preferable. In the present description, the term "over-torque performance is high" means the torque on shoulder resistance $\Delta T\square$ is high.

In order to raise the torque on shoulder resistance $\Delta T\square$, it is effective to lower the shouldering torque or to increase the yield torque. It is considered that hard particles, if contained in a solid lubricant coating layer, will increase the yield torque at a time of high interfacial pressure. When the yield torque increases, the torque on shoulder resistance $\Delta T\square$ increases.

However, as the result of investigations and studies conducted by the present inventors, the present inventors found that even though hard particles were simply contained in a solid lubricant coating layer, a high torque on shoulder resistance $\Delta T\square$ was not obtained. For example, although $CaF_2$ is a hard particle, as shown in an example described later, a high torque on shoulder resistance $\Delta T\square$ could not be obtained when using $CaF_2$.

Therefore, the present inventors conducted further studies of various kinds and discovered that a high torque on shoulder resistance $\Delta T\square$ is obtained by containing $Cr_2O_3$ in a solid lubricant coating layer.

Figure 2:
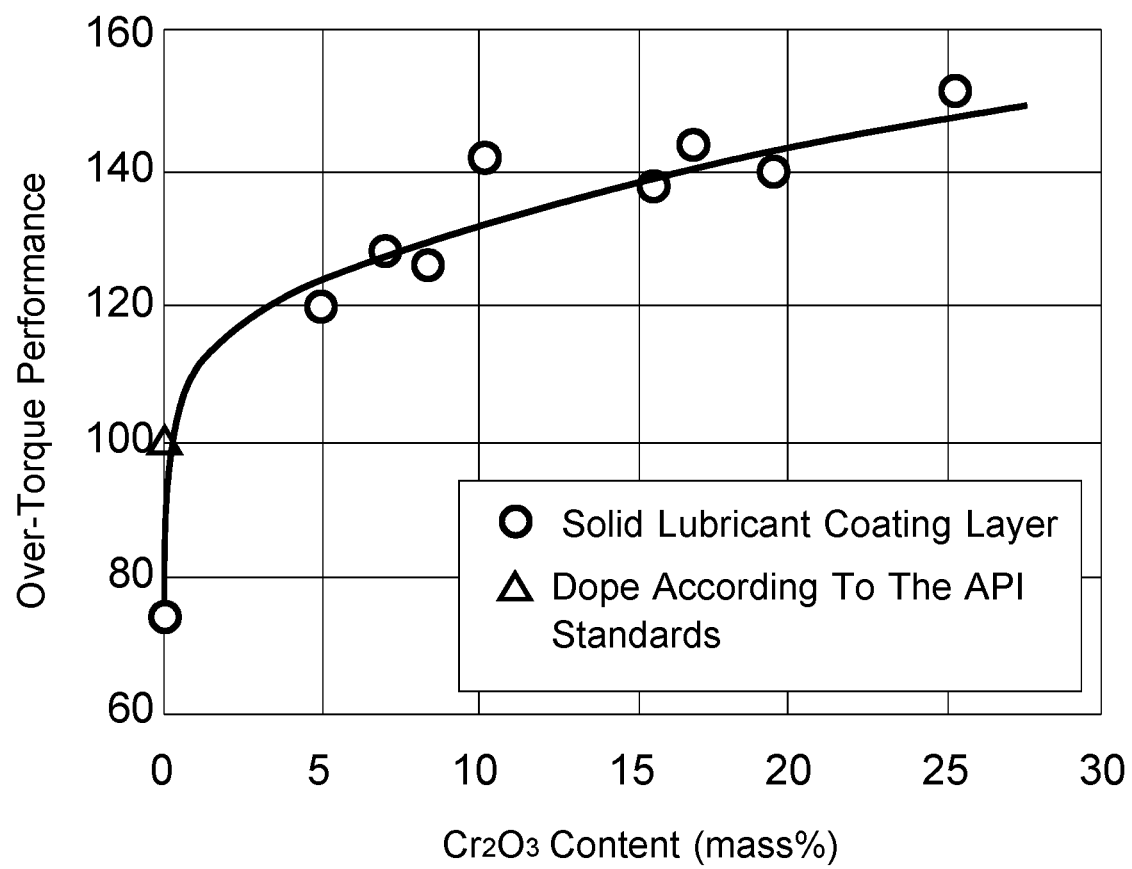
FIG. 2 is a graph illustrating the relation between the $Cr_2O_3$ content in a solid lubricant coating layer and over-torque performance.

FIG. 2 is a graph illustrating the relation between the $Cr_2O_3$ content in a solid lubricant coating layer and over-torque performance. FIG. 2 was obtained by means of an example that is described later. The abscissa in FIG. 2 represents the content of $Cr_2O_3$ in the solid lubricant coating layer. The ordinate in FIG. 2 represents the over-torque performance. Note that, the over-torque performance was determined as a relative value with respect to the torque on shoulder resistance $\Delta T\square$ of Test No. 1 where a dope according to the API (American Petroleum Institute) standards is used instead of a solid lubricant coating layer is taken as a reference (100). The symbol of white circle "○" in FIG. 2 denotes the over-torque performance for an example in which a solid lubricant coating layer was formed. The symbol of white triangle "△" in FIG. 2 denotes the over-torque performance when the dope according to the API standards was used instead of a solid lubricant coating layer.

Based on FIG. 2, it is shown that when the solid lubricant coating layer contains $Cr_2O_3$, the over-torque performance is more than 100. In other words, when $Cr_2O_3$ is contained, high over-torque performance is obtained.

[Galling Resistance]

The present inventors further discovered that, by adjusting the content of $Cr_2O_3$ in the solid lubricant coating layer, the galling resistance also increases, and not just the over-torque performance.

Figure 3:
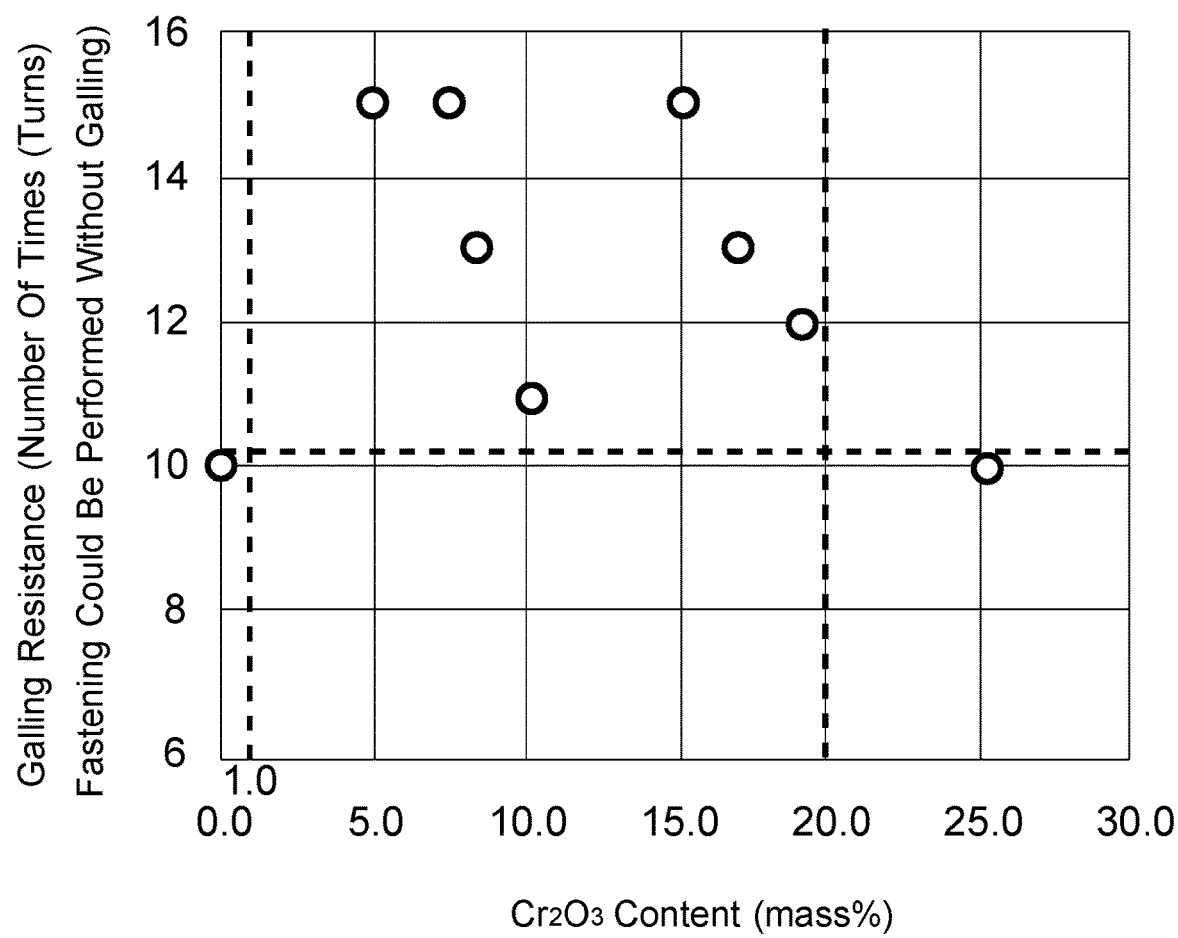
FIG. 3 is a graph illustrating the relation between the $Cr_2O_3$ content in a solid lubricant coating layer and galling resistance.

FIG. 3 is a graph illustrating the relation between the $Cr_2O_3$ content in a solid lubricant coating layer and the galling resistance. FIG. 3 was obtained by means of an example described later. The abscissa in FIG. 3 represents the content of $Cr_2O_3$ in the solid lubricant coating layer. The ordinate in FIG. 3 represents the number of times of fastening completed without the occurrence of galling.

FIG. 3 shows that, when the $Cr_2O_3$ content is from 1.0 to 20.0 mass %, the number of times fastening can be performed without the occurrence of galling is more than 10 times. In other words, when the $Cr_2O_3$ content is from 1.0 to 20.0 mass %, high galling resistance is obtained.

A threaded connection for pipes or tubes according to the present embodiment completed based on the above findings has the following characteristics. The threaded connection for pipes or tubes includes a pin and a box. The pin and the box each include a contact surface having a threaded portion and an unthreaded metal contact portion. The threaded connection for pipes or tubes includes a solid lubricant coating layer on at least one of the contact surfaces of the pin and the box. The solid lubricant coating layer contains a resin, a solid lubricant powder and $Cr_2O_3$.

The threaded connection for pipes or tubes of the present embodiment contains $Cr_2O_3$ in the solid lubricant coating layer. Therefore, the threaded connection for pipes or tubes has high over-torque performance.

In the aforementioned solid lubricant coating layer, the content of $Cr_2O_3$ is preferably from 1.0 to 20.0 mass %.

When the content of $Cr_2O_3$ in the solid lubricant coating layer is from 1.0 to 20.0 mass %, the galling resistance of the solid lubricant coating layer increases.

The aforementioned solid lubricant coating layer may contain $Cr_2O_3$ of 1.0 to 20.0 mass %, the resin of 50.0 to 90.0 mass %, and the solid lubricant powder of 5.0 to 30.0 mass %.

Preferably, the aforementioned resin is one or more types selected from a group consisting of epoxy resin, phenol resin, furan resin, polyamide-imide resin, polyamide resin, polyimide resin and polyether ether ketone resin.

In this case, the over-torque performance and galling resistance of the solid lubricant coating layer further increase.

The aforementioned resin may be one or more types selected from a group consisting of epoxy resin, phenol resin, polyamide-imide resin, and polyamide resin.

Preferably, the aforementioned solid lubricant powder is one or more types selected from a group consisting of graphite, zinc oxide, boron nitride, talc, molybdenum disulfide, tungsten disulfide, graphite fluoride, tin sulfide, bismuth sulfide, organic molybdenum, a thiosulfate compound, polytetrafluoroethylene, and melamine cyanurate.

Preferably, the aforementioned solid lubricant powder is one or more types selected from a group consisting of graphite and polytetrafluoroethylene.

In this case, the over-torque performance and galling resistance of the solid lubricant coating layer further increase.

A method according to the present embodiment for producing the threaded connection for pipes or tubes includes an application step and a solidification step. In the application step, a composition containing a resin, a solid lubricant powder and $Cr_2O_3$ is applied on at least one of the contact surfaces of the pin and the box. In the solidification step, the composition that was applied to the contact surface is solidified to form a solid lubricant coating layer.

The aforementioned production method may further include, before the application step, a Zn alloy plating layer formation step. In the Zn alloy plating layer formation step, a Zn alloy plating layer is formed by electroplating on at least one of the contact surfaces of the pin and the box.

The aforementioned production method may further include, before the Zn alloy plating layer formation step, a surface roughness formation step. In the surface roughness formation step, surface roughness is formed on at least one of the contact surfaces of the pin and the box.

Hereinafter, the threaded connection for pipes or tubes, and method for producing the threaded connection for pipes or tubes of the present embodiment will be described in detail.

Threaded Connection for Pipes or Tubes

Figure 4:
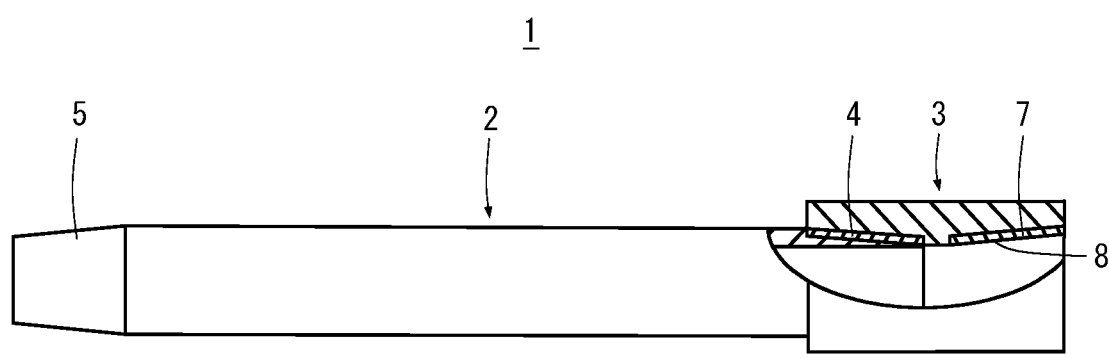
FIG. 4 is a diagram illustrating a configuration of a threaded connection for pipes or tubes according to the present embodiment.

The threaded connection for pipes or tubes includes a pin and a box. FIG. 4 is a diagram illustrating a configuration of the threaded connection for pipes or tubes according to the present embodiment. A threaded connection 1 for pipes or tubes includes a steel pipe 2 and a coupling 3. The pin 5 is formed at each end of the steel pipe 2 and the pin 5 includes a male threaded portion 4 in its outer surface. The box 8 is formed at each end of the coupling 3 and the box 8 includes a female threaded portion 7 in its inner surface. By fastening the pin 5 and box 8 together, the coupling 3 is attached to the end of the steel pipe 2. Although not illustrated in the drawings, a pin 5 of the steel pipe 2 and a box 8 of the coupling 3 that are not coupled to a mating member may have a protector (not illustrated) attached thereto for protecting their threaded portions.

A typical threaded connection 1 for pipes or tubes is of the coupling type like the one illustrated in FIG. 4, which includes the steel pipe 2 and the coupling 3. Also known is a threaded connection for pipes or tubes of the integral type, in which one end of a steel pipe 2 is in the form of a pin 5 and the other end thereof is in the form of a box 8, with no coupling 3 used. The threaded connection 1 for pipes or tubes of the present embodiment may be employed either as a coupling type threaded connection or as an integral type threaded connection.

Figure 5:
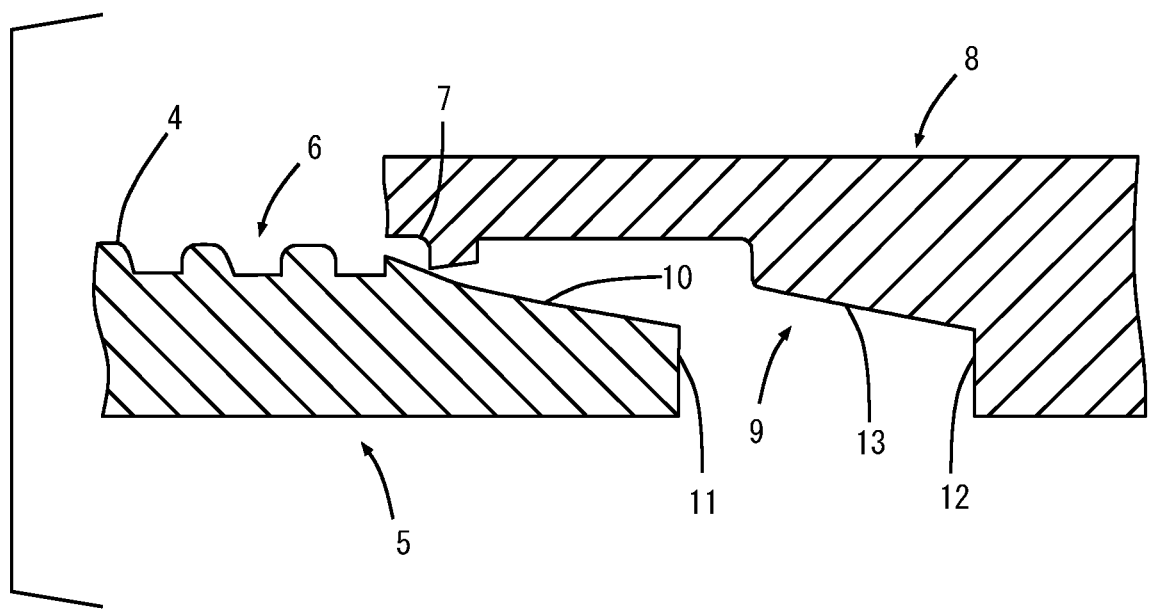
FIG. 5 is a cross-sectional view of the threaded connection for pipes or tubes.

The pin 5 and the box 8 include a contact surface that includes a threaded portion and an unthreaded metal contact portion. FIG. 5 is a cross-sectional view of the threaded connection 1 for pipes or tubes. The pin 5 includes the male threaded portion 4 and the unthreaded metal contact portion. The unthreaded metal contact portion of the pin 5 is formed at the tip end of the pin 5 and includes a metal seal portion 10 and a shoulder portion 11. The box 8 includes the female threaded portion 7 and the metal contact portion. The unthreaded metal contact portion of the box 8 is formed at the tip end of the box 8 and includes a metal seal portion 13 and a shoulder portion 12. The portion at which the pin 5 and the box 8 come into contact with each other when they are fastened together is referred to as the contact surface 6, 9. Specifically, when the pin 5 and the box 8 have been fastened to each other, the two shoulder portions (shoulder portions 11 and 12) come into contact with each other, and so do the two metal seal portions (metal seal portions 10 and 13) and the two threaded portions (male threaded portion 4 and female threaded portion 7). That is, in FIG. 5, the contact surface 6 on the pin 5 side includes the shoulder portion 11, the metal seal portion 10 and the threaded portion 4. The contact surface 9 on the box 8 side includes the shoulder portion 12, the metal seal portion 13 and the threaded portion 7. In FIG. 5, the pin 5 includes the respective structures of the shoulder portion 11, the metal seal portion 10 and the male threaded portion 4 in that order from the tip end of the steel pipe 2. Further, the box 8 includes the respective structures of the female threaded portion 7, the metal seal portion 13 and the shoulder portion 12 in that order from the tip end of the steel pipe 2 or the coupling 3. However, the arrangement of the shoulder portions 11 and 12, the metal seal portions 10 and 13 and the threaded portions 4 and 7 are not limited to the arrangement illustrated in FIG. 5. The arrangement of the respective structures is appropriately adjusted.

Solid Lubricant Coating Layer 21

Figure 6:
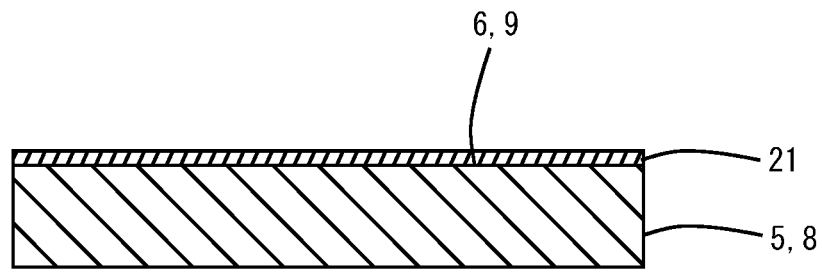
FIG. 6 is a cross-sectional view of a contact surface of the threaded connection for pipes or tubes according to the present embodiment.

In the threaded connection 1 for pipes or tubes, at least one of the pin 5 and box 8 includes a solid lubricant coating layer on its contact surface 6, 9. FIG. 6 is a cross-sectional view of a contact surface 6, 9 of the threaded connection 1 for pipes or tubes according to the present embodiment. A solid lubricant coating layer 21 is formed by, as described in a production method that is mentioned later, applying a composition for forming the solid lubricant coating layer 21 to at least one of the contact surfaces 6 and 9 of the pin 5 and the box 8, and solidifying the composition.

The solid lubricant coating layer 21 contains a resin, a solid lubricant powder and $Cr_2O_3$. Therefore, the composition for forming the solid lubricant coating layer 21 also contains a resin, a solid lubricant powder and $Cr_2O_3$. The composition may either be a composition of a solventless type (i.e., including the above-described components only) or be a composition of a solvent type in which the components are dissolved in a solvent. In the case of a composition of a solvent type, the mass percentage of each component refers to a mass percentage of the component relative to the total mass, as being 100%, of all components excluding the solvent contained in the composition. That is, the content of each component in the composition and the content of each component in the solid lubricant coating layer 21 are equal to each other. The components excluding the solvent in the composition and the components in the solid lubricant coating layer 21 are same. Hereinafter, the composition for forming the solid lubricant coating layer 21 is also referred to simply as "the composition".

Below, each component will be described in detail.

Resin

The resin acts as a binder. Any resin that is known in the art can be selected as the resin.

The resin, for example, is one type or two types selected from the group consisting of a thermosetting resin and a thermoplastic resin. The thermosetting resin, for example, is one or more types selected from the group consisting of epoxy resin, phenol resin, furan resin and polyimide resin. The thermoplastic resin, for example, is one or more types selected from the group consisting of polyamide-imide resin, polyamide resin and polyether ether ketone resin.

Preferably the resin is one or more types selected from the group consisting of epoxy resin, phenol resin, furan resin, polyamide-imide resin, polyamide resin, polyimide resin and polyether ether ketone resin. These resins have an appropriate hardness. Therefore, the wear resistance, galling resistance and over-torque performance of the solid lubricant coating layer 21 further increase.

More preferably, the resin is one or more types selected from the group consisting of epoxy resin, phenol resin, furan resin, polyamide-imide resin and polyamide resin.

Particularly preferably, the resin is one or more types selected from the group consisting of epoxy resin, polyamide-imide resin and polyamide resin.

An epoxy resin is a thermosetting resin. When a thermosetting treatment is performed, an epoxy resin forms a cross-linked network by means of epoxide groups that remain inside polymers. By this means, the epoxy resin sets.

A polyamide-imide resin is a thermoplastic resin.

A polyamide resin is a thermoplastic resin. A polyamide resin is a polymer formed by a large number of monomers that are bonded together by amide bonds.

The content of the resin in the solid lubricant coating layer 21 is preferably 50.0 to 90.0 mass %. If the content of the binder is 60.0 mass % or more, the adhesion properties of the solid lubricant coating layer 21 are further improved. Accordingly, a lower limit of the content of the resin in the solid lubricant coating layer 21 is more preferably 60.0 mass %, further preferably is 64.0 mass %, and further preferably is 70.0 mass %. The upper limit of the content of the resin in the solid lubricant coating layer 21 is more preferably 85.0 mass %, further preferably is 80.0 mass %, and further preferably is 75.0 mass %.

Solid Lubricant Powder

The solid lubricant coating layer 21 contains a solid lubricant powder in order to further increase the lubricity of the solid lubricant coating layer 21. A solid lubricant powder is a solid powder that has lubricity. A powder that is known in the art can be used as the solid lubricant powder.

A lubricant agent can be categorized into, for example, the following five types. The solid lubricant powder includes at least one selected from the group consisting of the following (1) to (4):

(1) Solid lubricant powders having a particular crystal structure, such as a lamellar hexagonal crystal structure, in which a slip easily occurs and which thereby exhibits lubricity (e.g., graphite, zinc oxide, boron nitride and talc);

(2) Solid lubricant powders including a reactive element in addition to a particular crystal structure and thereby exhibiting lubricity (e.g., molybdenum disulfide, tungsten disulfide, graphite fluoride, tin sulfide, bismuth sulfide, and organomolybdenum);

(3) Solid lubricant powders exhibiting lubricity due to chemical reactivity (e.g., thiosulfate compounds);

(4) Solid lubricant powders exhibiting lubricity due to plastic or viscoplastic behavior under frictional stresses (e.g., polytetrafluoroethylene (PTFE) and melamine cyanurate (MCA)); and (5) Lubricant agents that are in liquid form or in grease form and exhibiting lubricity by existing at the interface between the contact surfaces and preventing direct surface-to-surface contact (e.g., a perfluoropolyether (PFPE)).

Any of the above-mentioned solid lubricant powders (1) to (4) may be employed. One of the above-mentioned solid lubricant powders (1) to (4) may be used alone. For example, the solid lubricant powder (1) may be used alone. Two or more of the above-mentioned solid lubricant powders (1) to (4) may be used in combination. For example, in addition to the solid lubricant powder (1), the solid lubricant powder (4) may be used in combination. That is, preferably the solid lubricant powder is one or more types selected from the group consisting of graphite, zinc oxide, boron nitride, talc, molybdenum disulfide, tungsten disulfide, graphite fluoride, tin sulfide, bismuth sulfide, organic molybdenum, a thiosulfate compound, polytetrafluoroethylene (PTFE) and melamine cyanurate (MCA).

Preferably, the solid lubricant powder contains one type or more selected from the group consisting of the aforementioned (1) and (4). Among the solid lubricant powders (1), graphite is preferred from the standpoint of adhesion properties and anti-rust properties of the solid lubricant coating layer 21 or earthy graphite is preferred from the standpoint of film forming properties. Among the solid lubricant powder (4), polytetrafluoroethylene (PTFE) is preferred.

Further preferably, the solid lubricant powder is polytetrafluoroethylene (PTFE).

The content of the solid lubricant powder in the solid lubricant coating layer 21 is preferably in the range of 5.0 to 30.0 mass %. When the content of the solid lubricant powder is not less than 5.0 mass %, the galling resistance is further enhanced. This increases the number of operations of fastening and loosening that can be performed before galling occurs. The lower limit of the content of the solid lubricant powder is more preferably 10.0 mass %, and further preferably is 15.0 mass %. On the other hand, if the content of the solid lubricant powder is not more than 30.0 mass %, the strength of the solid lubricant coating layer 21 increases further. As a result, wear of the solid lubricant coating layer 21 is inhibited. The upper limit of the content of the solid lubricant powder is more preferably 28.0 mass %, further preferably is 25.0 mass %, and further preferably is 20.0 mass %.

$Cr_2O_3$ $Cr_2O_3$ is also referred to as "chromium oxide (III)". $Cr_2O_3$ is an inorganic compound. The formula weight of $Cr_2O_3$ is 151.99. $Cr_2O_3$ is obtained by thermal decomposition of ammonium dichromate (ammonium bichromate). $Cr_2O_3$ becomes a dark-green crystal with a metallic luster by sublimation and purification. $Cr_2O_3$ is very stable, and is harder than quartz. $Cr_2O_3$ does not have toxicity and is not hazardous.

As described above, if the solid lubricant coating layer 21 contains $Cr_2O_3$, the over-torque performance increases. Further, if the content of $Cr_2O_3$ is from 1.0 to 20.0 mass %, the galling resistance also increases.

The $Cr_2O_3$ content in the solid lubricant coating layer 21 is preferably from 1.0 to 20.0 mass %. If the $Cr_2O_3$ content is 1.0 mass % or more, sufficient over-torque performance is obtained and galling resistance also increases. If the $Cr_2O_3$ content is not more than 20.0 mass %, a decline in the strength and an increase in friction of the solid lubricant coating layer 21 is suppressed, and galling resistance increases. The lower limit of the $Cr_2O_3$ content is preferably 1.0 mass %, more preferably is 5.0 mass %, further preferably is 7.0 mass %, and further preferably is 10.0 mass %. The upper limit of the $Cr_2O_3$ content is preferably 20.0 mass %, more preferably is 18.0 mass %, further preferably is 16.0 mass %, and further preferably is 15.0 mass %.

$Cr_2O_3$, for example, is a dark green particle. A preferable particle size of $Cr_2O_3$ is 45 µm or less. From the viewpoint of uniform dispersibility, a particle size of 10 µm or less is more preferable. The particle size is the arithmetic mean value of an effective particle size distribution obtained by particle size distribution measurement performed by a laser diffraction and scattering method (using the SALD series manufactured by Shimadzu Corporation). A preferable lower limit of the $Cr_2O_3$ particle size is, for example, 1 µm.

The $Cr_2O_3$ is, for example, chromium oxide (III) manufactured by Wako Pure Chemical Industries, Ltd.

Other Components

The solid lubricant coating layer 21 may also contain an anti-rust additive and an antiseptic agent or the like that are known in the art.

Anti-Rust Additive

The solid lubricant coating layer 21 needs to have anti-rust properties that can be maintained for a long period of time before being actually used. For this reason, the solid lubricant coating layer 21 may include an anti-rust additive. The anti-rust additive generically refers to additives having corrosion resistance properties. The anti-rust additive includes, for example, at least one selected from the group consisting of aluminum tripolyphosphate, aluminum phosphite, and calcium ion-exchanged silica. Preferably, the anti-rust additive includes at least one selected from the group consisting of calcium ion-exchanged silica and aluminum phosphite. Other examples of the anti-rust additives that may be employed include a commercially available reactive water repellent agent.

The content of the anti-rust additive in the solid lubricant coating layer 21 is preferably in the range of 2 to 10 mass %. When the content of the anti-rust additive is not less than 2 mass %, the solid lubricant coating layer 21 further exhibits consistently high anti-rust properties. On the other hand, when the content of the anti-rust additive is not greater than 10 mass %, the solid lubricant coating layer 21 exhibits consistently high lubricity. If the content of the anti-rust additive is greater than 10 mass %, the anti-rust effect will reach saturation.

Antiseptic Agent

The solid lubricant coating layer 21 may further contain an antiseptic agent. The antiseptic agent also generically refers to additives having corrosion resistance properties.

Thickness of Solid Lubricant Coating Layer

The thickness of the solid lubricant coating layer 21 is preferably 10 to 40 µm. When the thickness of the solid lubricant coating layer 21 is 10 µm or more, a high lubricity can be stably obtained. On the other hand, when the thickness of the solid lubricant coating layer 21 is not more than 40 µm, the adhesion properties of the solid lubricant coating layer 21 are stable. Furthermore, when the thickness of the solid lubricant coating layer 21 is not more than 40 µm, because the thread tolerance (clearance) of the sliding surfaces widens, interfacial pressure during sliding becomes lower. Therefore, the fastening torque can be inhibited from becoming excessively high. Accordingly, the thickness of the solid lubricant coating layer 21 is preferably 10 to 40 µm.

The thickness of the solid lubricant coating layer 21 is measured by the following method. The thickness of the solid lubricant coating layer 21 is measured at four locations on the contact surfaces 6 and 9 on which the solid lubricant coating layer 21 is formed, using an eddy current phase-type coating thickness gauge PHASCOPE PMP910 manufactured by Helmut Fischer GmbH. The measurement is performed by a method conforming to ISO (International Organization for Standardization) 21968 (2005). The measurement locations are four locations (four locations at 0°, 90°, 180° and 270°) in the pipe circumferential direction of the threaded connection 1 for pipes or tubes. The arithmetic mean of the measurement results is taken as the thickness of the solid lubricant coating layer 21.

The solid lubricant coating layer 21 may be formed of a single layer or multiple layers. The term "multiple layers" refers to two or more layers of the solid lubricant coating layer 21 deposited in sequence on the contact surface. The two or more layers of the solid lubricant coating layer 21 can be formed by repeating the application and solidification of the composition. The solid lubricant coating layer 21 may be formed directly on the contact surface or may be formed after a surface preparation treatment(s) described below is performed on the contact surface.

Base Metal of Threaded Connection for Pipes or Tubes

The composition of the base metal of the threaded connection 1 for pipes or tubes is not particularly limited. Examples of the base metal include carbon steels, stainless steels and alloy steels. Among alloy steels, high alloy steels such as duplex stainless steels that contain alloying elements such as Cr, Ni and Mo and an Ni alloy have high corrosion resistance. Therefore by using these high alloy steels as a base metal, excellent corrosion resistance is obtained in a corrosive environment that contains hydrogen sulfide or carbon dioxide or the like.

Production Method

Hereinafter, a method according to the present embodiment for producing the threaded connection 1 for pipes or tubes will be described.

A method for producing the threaded connection 1 for pipes or tubes according to the present embodiment includes a solid lubricant coating layer formation step. In the solid lubricant coating layer formation step, the solid lubricant coating layer 21 is formed on at least one of the contact surfaces of the pin 5 and the box 8.

Solid Lubricant Coating Layer Formation Step

The solid lubricant coating layer formation step includes an application step and a solidification step. In the application step, a composition for solid lubricant coating layer formation (also referred to simply as "composition") is applied to at least one of the contact surfaces of the pin 5 and the box 8. In the solidification step, the composition that was applied to the contact surface is solidified to form the solid lubricant coating layer 21.

Firstly, the composition for solid lubricant coating layer formation is prepared. The composition for solid lubricant coating layer formation contains a resin, a solid lubricant powder and $Cr_2O_3$. The composition of a solventless type may be prepared, for example, by heating the resin to a molten state, adding the solid lubricant powder and $Cr_2O_3$ thereto, and mixing them. The composition may be made of a powder mixture prepared by mixing all the components in powder form.

The composition of a solvent type may be prepared, for example, by dissolving or dispersing the resin, solid lubricant powder and $Cr_2O_3$ in a solvent and mixing them. Examples of the solvent include water, various types of alcohol, and organic solvents. The proportion of the solvent is not particularly limited. The proportion of the solvent may be adjusted to an appropriate viscosity according to the application method. The proportion of the solvent is, for example, 30 to 50 mass % when taking the total of all components other than the solvent as 100 mass %.

Application Step

In the application step, the composition is applied to the contact surface 6, 9 by a method known in the art.

For the composition of a solventless type, a hot melt process may be employed to apply the composition. In the hot melt process, the composition is heated to melt the resin to a fluid state with low viscosity. The composition in a fluid state can be sprayed from a spray gun having functions for temperature holding. The composition is heated and melted within a tank including a suitable stirring mechanism, is supplied via a metering pump to the spray head (held at a predetermined temperature) of the spray gun by a compressor, and is sprayed. The holding temperatures for the tank interior and the spray head are adjusted in accordance with the melting point of the resin in the composition. Another application method, such as brushing or dipping, may be employed in place of spray coating. The temperature to which the composition is heated is preferably higher than the melting point of the resin by 10 to 50° C. Prior to application of the composition, at least one contact surface 6, 9, to which the composition is to be applied, of the pin 5 or of the box 8, is preferably heated to a temperature higher than the melting point of the resin. This makes it possible to achieve good coating properties.

In the case of the composition of a solvent type, the composition in solution form is applied to the contact surface by spray coating or by another method. In this case, the viscosity of the composition is to be adjusted so that it can be applied by spraying in an environment at normal temperature and pressure.

Solidification Step

In the solidification step, the composition applied to the contact surface is solidified to form the solid lubricant coating layer 21.

In the case of the composition of a solventless type, the solid lubricant coating layer 21 is formed by cooling the composition applied to the contact surface 6, 9 to allow the composition in a molten state to solidify. The cooling process can be carried out by a method known in the art. Examples of the cooling process include natural cooling and air cooling.

In the case of the composition of a solvent type, the solid lubricant coating layer 21 is formed by drying the composition applied to the contact surface 6, 9 to allow the composition to solidify. The drying process can be carried out by a method known in the art. Examples of the drying process include natural drying, low-temperature air drying, and vacuum drying.

The solidification step may be carried out by rapid cooling using, for example, a nitrogen gas cooling system or a carbon dioxide cooling system. In the case where rapid cooling is performed, the cooling is carried out in an indirect manner at the opposite surface to the contact surface 6, 9 (in the case of the box 8, at the outer surface of the steel pipe 2 or the coupling 3, and in the case of the pin 5, at the inner surface of the steel pipe 2). This inhibits degradation of the solid lubricant coating layer 21 that may be caused by rapid cooling.

Preferably, the solid lubricant coating layer 21 covers all of at least one of the contact surfaces 6 and 9 of the pin 5 and the box 8. The solid lubricant coating layer 21 may cover only part of the contact surfaces 6 and 9 (e.g., only the metal seal portions 10 and 13).

The method for producing the threaded connection 1 for pipes or tubes according to the present embodiment may also include a Zn alloy plating layer formation step before the solid lubricant coating layer formation step. The Zn alloy plating layer formation step is performed before the solid lubricant coating layer formation step, that is, prior to the aforementioned application step. In the Zn alloy plating layer formation step, a Zn alloy plating layer is formed by electroplating on at least one of the contact surfaces of the pin 5 and the box 8.

Zn Alloy Plating Layer Formation Step

In the Zn alloy plating layer formation step, a Zn alloy plating layer is formed by electroplating on at least one of the contact surfaces of the pin 5 and the box 8.

Alternatively, in the Zn alloy plating layer formation step, an Zn alloy plating layer is formed by electroplating on at least one of the contact surfaces of the pin 5 and the box 8 or on surface roughness formed on the contact surfaces.

By performing the Zn alloy plating layer formation step, the galling resistance and corrosion resistance of the threaded connection 1 for pipes or tubes are increased. Examples of the Zn alloy plating layer formation step include treatments of applying a single layer of plating using Zn metal, treatments of applying a two-layer plating including a Zn layer and Ni layer, and treatments of applying a three-layer plating including a Zn layer, Cu layer, and Sn layer. For the steel pipe 2 formed from a steel having a Cr content of 5% or greater, preferred treatments are a Zn—Co alloy plating treatment, a Cu—Sn—Zn alloy plating treatment and a Zn—Ni alloy plating treatment.

The electroplating treatment can be carried out by a method known in the art. For example, a plating bath including ions of the metal elements to be contained in the Zn alloy plating layer is prepared. Next, at least one of the contact surfaces 6 and 9 of the pin 5 and the box 8 is immersed in the plating bath. By current conduction through the contact surface 6 and/or 9, a Zn alloy plating layer is formed on the contact surface. The treatment conditions including the temperature of the plating bath and the duration of the plating treatment may be set appropriately.

More specifically, for example, in the case of forming a Cu—Sn—Zn alloy plating layer, the plating bath contains copper ions, tin ions and zinc ions. The composition of the plating bath is preferably Cu: 1 to 50 g/L, Sn: 1 to 50 g/L and Zn: 1 to 50 g/L. The electroplating conditions are, for example, a plating bath pH of 1 to 10, a plating bath temperature of 60° C., a current density of 1 to 100 $A/dm^2$ and a treatment time of 0.1 to 30 minutes.

In the case of forming a Zn—Ni alloy plating layer, the plating bath contains zinc ions and nickel ions. The composition of the plating bath is preferably Zn: 1 to 100 g/L and Ni: 1 to 50 g/L. The electroplating conditions are, for example, a plating bath pH of 1 to 10, a plating bath temperature of 60° C., a current density of 1 to 100 A/dm$^2$ and a treatment time of 0.1 to 30 minutes.

The hardness of the Zn alloy plating layer is preferably a micro-Vickers hardness of 300 or more. If the hardness of the Zn alloy plating layer is 300 or more, the threaded connection 1 for pipes or tubes exhibits consistently high corrosion resistance.

The hardness of the Zn alloy plating layer can be measured as follows. Five arbitrary regions are selected in the Zn alloy plating layer of the obtained threaded connection 1 for pipes or tubes. The Vickers hardness (HV) in each of the selected regions is measured in accordance with JIS Z 2244 (2009). The test conditions are, a test temperature of normal temperature (25° C.) and a test force of 2.94 N (300 gf). The mean of the obtained values (from a total of 5 places) is defined as the hardness of the Zn alloy plating layer.

In the case of multi-layer plating treatments, the thickness of the lowermost plating layer is preferably less than 1 μm. The thickness of the plating layer (total thickness of plating layers in the case of multi-layer plating) is preferably in the range of 5 to 15 μm.

The thickness of the Zn alloy plating layer is measured as follows. A probe of an eddy current phase-type film thickness measuring instrument conforming to ISO (International Organization for Standardization) 21968 (2005) is brought into contact with the contact surface on which the Zn alloy plating layer is formed. A phase difference between a high-frequency magnetic field on the input side of the probe and an eddy current on the Zn—Ni alloy plating layer that was excited by the high-frequency magnetic field is measured. The phase difference is converted into a thickness of the Zn alloy plating layer.

The method for producing the threaded connection 1 for pipes or tubes according to the present embodiment may further include, before the Zn alloy plating layer formation step, a surface roughness formation step of forming surface roughness on at least one of the contact surfaces of the pin 5 and the box 8.

Surface Roughness Formation Step

In the surface roughness formation step, surface roughness is formed on at least one of the contact surfaces of the pin 5 and the box 8. The surface roughness preferably has an arithmetic mean roughness Ra of 1 to 8 μm and a maximum height roughness Rz of 10 to 40 μm. When the arithmetic mean roughness Ra is not less than 1 μm and the maximum height roughness Rz is not less than 10 μm, the solid lubricant coating layer 21 exhibits further enhanced adhesion properties. When the arithmetic mean roughness Ra is not greater than 8 μm and the maximum height roughness Rz is not greater than 40 μm, friction is inhibited and therefore damage and delamination of the solid lubricant coating layer 21 is inhibited.

The maximum height roughness Rz and the arithmetic mean roughness Ra referred to in the present description are measured based on JIS B 0601 (2013). The maximum height roughness Rz and the arithmetic mean roughness Ra are measured using a scanning probe microscope (SPI 3800N, manufactured by SII NanoTechnology Inc.). The measurement conditions are the number of acquired data points of 1024×1024 in sample regions of 2 μm×2 μm as a unit of acquired data. The sampling length is 2.5 mm. The greater the maximum height roughness Rz is, the more the contact area with the solid lubricant coating layer 21 increases. Therefore, the adhesion properties with respect to the solid lubricant coating layer 21 increase by an anchor effect. When the adhesion properties of the solid lubricant coating layer 21 increase, the threaded connection 1 for pipes or tubes exhibits further increased galling resistance.

Typically, the maximum height roughness Rz with respect to the surface roughness of the contact surfaces 6 and 9 of the threaded connection 1 for pipes or tubes is in the range of approximately 3 to 5 μm. When the surface roughness of the contact surfaces 6 and 9 is moderately large, the adhesion properties of the coating (solid lubricant coating layer 21 or Zn alloy plating layer) formed on the relevant contact surface increase. As a result, the threaded connection 1 for pipes or tubes exhibits even higher galling resistance and corrosion resistance. Accordingly, it is preferred that the contact surfaces 6 and 9 are subjected to a surface roughness formation step before the composition for forming the aforementioned solid lubricant coating layer 21 is applied thereto. For example, the surface roughness formation step is at least one treatment selected from the group consisting of a sand blasting treatment, a pickling treatment, and a chemical conversion treatment.

Sand Blasting Treatment

The sand blasting treatment is a treatment in which a blast material (abrasive) is mixed with compressed air and the mixture is propelled onto the contact surface 6, 9. Examples of the blast material include spherical shot material and angular grit material. The sand blasting treatment increases the surface roughness of the contact surface 6, 9. The sand blasting treatment may be carried out by a method known in the art. For example, air is compressed by a compressor and a blast material is mixed with the compressed air. The blast material may be made of, for example, stainless steel, aluminum, ceramic, or alumina. The sand blasting treatment conditions such as propelling speed may be set appropriately.

Pickling Treatment

The pickling treatment is a treatment in which the contact surface 6, 9 is immersed and roughened in a solution of a strong acid such as sulfuric acid, hydrochloric acid, nitric acid, or hydrofluoric acid. This increases the surface roughness of the contact surface 6, 9.

Chemical Conversion Treatment

The chemical conversion treatment is a treatment in which a porous chemical conversion coating having a high surface roughness is formed. Examples of the chemical conversion treatment include phosphate chemical conversion treatments, oxalate chemical conversion treatment, and borate chemical conversion treatment. From the standpoint of adhesion properties of the solid lubricant coating layer 21, a phosphate chemical conversion treatment is preferred. The phosphate chemical conversion treatment is, for example, a phosphate chemical conversion treatment using manganese phosphate, zinc phosphate, manganese iron phosphate, or calcium zinc phosphate.

The phosphate chemical conversion treatment can be carried out by a method known in the art. The treatment solution may be a common acidic solution for phosphate chemical conversion treatment for zinc-plated products. An example of the solution is a solution for zinc phosphate chemical conversion treatment containing 1 to 150 g/L of phosphate ions, 3 to 70 g/L of zinc ions, 1 to 100 g/L of nitrate ions, and 0 to 30 g/L of nickel ions. Solutions for manganese phosphate chemical conversion treatments, which are conventionally used for threaded connection 1 for pipes or tubes, may also be used. The temperature of the solution is in the range of room temperature to 100° C., for example. The treatment time may be set depending on the desired thickness of the coating and, for example, may be 15 minutes. To facilitate the formation of the chemical conversion coating, surface modification may be performed prior to the phosphate chemical conversion treatment. The surface modification refers to the treatment including immersion in a surface modification aqueous solution containing colloidal titanium. After the phosphate chemical conversion treatment, it is preferred that rinsing with water or with warm water is carried out before drying.

The chemical conversion coating is porous. Thus, when the solid lubricant coating layer 21 is formed on the chemical conversion coatings, the so-called "anchoring effect" is produced and, as a result, the solid lubricant coating layer 21 exhibits further increased adhesion properties. The thickness of the phosphate coating is preferably in the range of 5 to 40 μm. When the thickness of the phosphate coating is not less than 5 μm, sufficient corrosion resistance is ensured. When the thickness of the phosphate coating is not greater than 40 μm, the solid lubricant coating layer 21 exhibits consistently high adhesion properties.

In the surface roughness formation step, only one of the treatments may be performed or a plurality of the treatments may be performed in combination. In the case where a single treatment is to be performed, it is preferable to perform at least one treatment selected from the group consisting of a sand blasting treatment, a pickling treatment, and a phosphate chemical conversion treatment. Two or more treatments may be performed in the surface roughness formation step. In such a case, a sand blasting treatment is performed first and thereafter a phosphate chemical conversion treatment is performed, for example. The solid lubricant coating layer 21 is formed after performing the surface roughness formation step. This results in further increased adhesion properties of the solid lubricant coating layer 21.

Trivalent Chromating Treatment

In the case of performing the aforementioned Zn alloy plating treatment, a trivalent chromating treatment may be performed at a time that is after the Zn alloy plating layer formation step and before the solid lubricant coating layer formation step. The trivalent chromating treatment is a treatment for forming a trivalent chromium chromate coating. The coating formed by the trivalent chromating treatment inhibits white rust that may form on the surface of the Zn alloy plating layer. This improves the appearance of the product. (The white rust on the Zn alloy plating layer is not rust of the base metal of the threaded connection 1 for pipes or tubes. Thus, the rust does not affect the galling resistance or the corrosion resistance of the threaded connection 1 for pipes or tubes.) When the solid lubricant coating layer 21 is formed on the trivalent chromate coating, the solid lubricant coating layer 21 exhibits further increased adhesion properties.

The trivalent chromating treatment may be carried out by a method known in the art. For example, at least one of the contact surfaces 6, 9 of the pin 5 and the box 8 is immersed in a chromating solution or the chromating solution is sprayed onto the contact surface 6, 9. Thereafter, the contact surface 6, 9 is rinsed with water. Alternatively, the contact surface 6, 9 is immersed in the chromating solution and, after current conduction, rinsed with water. Alternatively, the chromating solution is applied to the contact surface 6, 9 and dried by heating. The treatment conditions for trivalent chromating may be set appropriately.

The thickness of the trivalent chromate coating can be measured by the same method as the method used to measure the solid lubricant coating layer 21.

In the method for producing the threaded connection 1 for pipes or tubes of the present embodiment, subjecting at least one of the contact surfaces 6 and 9 of the pin 5 and the box 8 to the solid lubricant coating layer formation step suffices. In other words, with regard to the Zn alloy plating layer formation step, the surface roughness formation step and the trivalent chromating treatment, the treatments performed for the pin 5 and the box 8 may be the same, or the treatments performed for the pin 5 and the box 8 may be different.

EXAMPLE

An example of the present invention will be described below. It should be noted that the present invention is not limited to the example. In the example, the contact surface of the pin is referred to as the pin surface and the contact surface of the box is referred to as the box surface. Unless otherwise specified, percent in the example means mass percent.

In the present example, VAM21 (registered trademark) manufactured by NIPPON STEEL & SUMITOMO METAL CORPORATION were used. VAM21 (registered trademark) is a threaded connection for pipes or tubes having an outside diameter of 177.80 mm (7 inches) and a wall thickness of 11.506 mm (0.453 inches). The steel grade was 13Cr steel. The 13Cr steel had a composition, C: 0.19%, Si: 0.25%, Mn: 0.8%, P: 0.02%, S: 0.01%, Cu: 0.04%, Ni: 0.10%, Cr: 13.0%, Mo: 0.04%, and the balance: Fe and impurities.

A blasting process was performed on the pin surface and the box surface of the test numbers as shown in Table 1 and Table 2. A sand blasting process (abrasive grain of 100 mesh) was performed as the blasting process, and surface roughness was formed. The arithmetic mean roughness Ra and maximum height roughness Rz for each test number were as shown in Table 1 and Table 2. The arithmetic mean roughness Ra and the maximum height roughness Rz were measured based on JIS B 0601 (2013). Measurement of the arithmetic mean roughness Ra and the maximum height roughness Rz was performed using a scanning probe microscope (SPI 3800N, manufactured by SII NanoTechnology Inc.). The measurement conditions were the number of acquired data points of 1024×1024 in sample regions of 2 μm×2 μm as a unit of acquired data.

TABLE 1

| Test No. | | Surface roughness formation | Zn alloy plating layer (Thickness) | Solid lubricant coating layer (only main components listed) (Thickness) | Other coating layer (Thickness) |
|---|---|---|---|---|---|
| 1 | Pin surface | None<br>Ra: 0.3 μm<br>Rz: 5.5 μm | — | Epoxy resin + 20.2% PTFE particles + 5.1% $Cr_2O_3$ particles (25 μm) | — |

TABLE 1-continued

| Test No. | | Surface roughness formation | Zn alloy plating layer (Thickness) | Solid lubricant coating layer (only main components listed) (Thickness) | Other coating layer (Thickness) |
|---|---|---|---|---|---|
| | Box surface | None<br>Ra: 0.3 μm<br>Rz: 5.2 μm | — | Epoxy resin + 20.2% PTFE particles + 5.1% $Cr_2O_3$ particles (25 μm) | — |
| 2 | Pin surface | None<br>Ra: 0.3 μm<br>Rz: 5.6 μm | — | Epoxy resin + 20.2% PTFE particles + 7.1% $Cr_2O_3$ particles (28 μm) | — |
| | Box surface | None<br>Ra: 0.3 μm<br>Rz: 5.1 μm | — | Epoxy resin + 20.2% PTFE particles + 7.0% $Cr_2O_3$ particles (26 μm) | — |
| 3 | Pin surface | None<br>Ra: 0.3 μm<br>Rz: 5.9 μm | — | Epoxy resin + 19.9% PTFE particles + 15.5% $Cr_2O_3$ particles (28 μm) | — |
| | Box surface | None<br>Ra: 0.3 μm<br>Rz: 5.6 μm | — | Epoxy resin + 19.9% PTFE particles + 15.5% $Cr_2O_3$ particles (30 μm) | — |
| 4 | Pin surface | Sand blasting<br>Ra: 1.6 μm<br>Rz: 20.0 μm | Zn—Ni alloy plating layer (8 μm) | — | Chromate (trivalent) (0.3 μm) |
| | Box surface | None<br>Ra: 0.3 μm<br>Rz: 5.8 μm | — | Epoxy resin + 10.3% PTFE particles + 19.2% $Cr_2O_3$ particles (25 μm) | — |
| 5 | Pin surface | Sand blasting<br>Ra: 1.6 μm<br>Rz: 20.0 μm | Zn—Ni alloy plating layer (8 μm) | — | Chromate (trivalent) (0.3 μm) |
| | Box surface | Sand blasting<br>Ra: 1.5 μm<br>Rz: 19.0 μm | Zn—Ni alloy plating layer (8 μm) | Polyamide-imide resin + 15.3% PTFE particles + 16.7% $Cr_2O_3$ particles (31 μm) | — |

TABLE 2

| Test No. | | Surface roughness formation | Zn alloy plating layer (Thickness) | Solid lubricant coating layer (only main components listed) (Thickness) | Other coating layer (Thickness) |
|---|---|---|---|---|---|
| 6 | Pin surface | None<br>Ra: 0.3 μm<br>Rz: 5.8 μm | Zn—Ni alloy plating layer (8 μm) | — | Chromate (trivalent) (0.3 μm) |
| | Box surface | Sand blasting<br>Ra: 2.0 μm<br>Rz: 24.0 μm | Zn—Ni alloy plating layer (8 μm) | Phenol resin + 20.0% PTFE particles + 10.0% $Cr_2O_3$ particles (26 μm) | — |
| 7 | Pin surface | None<br>Ra: 0.3 μm<br>Rz: 5.8 μm | Zn—Ni alloy plating layer (8 μm) | — | Chromate (trivalent) (0.3 pm) |
| | Box surface | Sand blasting<br>Ra: 2.0 μm<br>Rz: 24.0 μm | Cu—Sn—Zn alloy plating layer (10 μm) | Polyamide-imide + 5% graphite particles + 8% $Cr_2O_3$ particles (30 μm) | — |
| 8 | Pin surface | None<br>Ra: 0.3 μm<br>Rz: 5.8 μm | Zn—Ni alloy plating layer (8 μm) | — | Chromate (trivalent) (0.3 pm) |
| | Box surface | Sand blasting<br>Ra: 2.0 μm<br>Rz: 24.0 μm | Zn—Ni alloy plating layer (8 μm) | Epoxy resin + 10.3% PTFE particles (25 μm) | — |
| 9 | Pin surface | None<br>Ra: 0.3 μm<br>Rz: 5.8 μm | Zn—Ni alloy plating layer (8 μm) | — | Chromate (trivalent) (0.3 pm) |
| | Box surface | None<br>Ra: 0.3 μm<br>Rz: 5.8 μm | Zn—Ni alloy plating layer (8 μm) | Epoxy resin + 10.4% PTFE particles + 25.0% $Cr_2O_3$ particles (25 μm) | — |
| 10 | Pin surface | None<br>Ra: 0.3 μm<br>Rz: 5.6 μm | — | Epoxy resin + 20.1% PTFE particles + 6.9% $CaF_2$ particles (28 μm) | — |
| | Box surface | None<br>Ra: 0.3 μm<br>Rz: 5.1 μm | — | Epoxy resin + 20.1% PTFE particles + 6.9% $CaF_2$ particles (26 μm) | — |
| 11 | Pin surface | None<br>Ra: 0.3 μm<br>Rz: 5.5 μm | — | Dope according to the API standards (in accordance with API Bul 5A2) applied by brush | — |
| | Box surface | None<br>Ra: 0.3 μm<br>Rz: 5.2 μm | — | Dope according to the API standards (in accordance with API Bul 5A3) applied by brush | — |

Thereafter, the Zn—Ni alloy plating layers, Cu—Sn—Zn alloy plating layers and solid lubricant coating layers shown in Table 1 and Table 2 were formed and the pin and box of each test number were prepared. In Table 1 and Table 2, the column "solid lubricant coating layer" lists only the main components. The detailed components of the solid lubricant coating layers are described hereunder. The thickness of the obtained solid lubricant coating layer is shown in the "thickness" section of the "solid lubricant coating layer" column in Table 1 and Table 2. The method used to measure the thickness of the solid lubricant coating layer was as described above.

The methods for forming the Zn—Ni alloy plating layer, the Cu—Sn—Zn alloy plating layer and the solid lubricant coating layer were as described hereunder. The thicknesses of the Zn—Ni alloy plating layer, the Cu—Sn—Zn alloy plating layer and the solid lubricant coating layer were as shown in Table 1 and Table 2. The method used to measure the thickness of each layer was as described above.

Test No. 1

In Test No. 1, finish machine grinding was performed on the pin surface and the box surface. Thereafter, a composition for solid lubricant coating layer formation was applied to the pin surface and the box surface. The composition for solid lubricant coating layer formation contained an epoxy resin (balance), PTFE particles (20.2%), $Cr_2O_3$ particles (5.1%), and a solvent (water, alcohol, and a surfactant). The composition for solid lubricant coating layer formation was applied by spraying, and thereafter was dried by heating at 90° C. for five minutes. After being dried by heating, curing was performed for 20 minutes at 210° C., and a solid lubricant coating layer was formed.

Test No. 2

In Test No. 2, finish machine grinding was performed on the pin surface and the box surface. Thereafter, a composition for solid lubricant coating layer formation was applied to the pin surface and the box surface. The composition for solid lubricant coating layer formation contained an epoxy resin (balance), PTFE particles (20.2%), $Cr_2O_3$ particles (7.1% for the pin, and 7.0% for the box), and a solvent (water, alcohol, and a surfactant). The composition for solid lubricant coating layer formation was applied by spraying, and thereafter was dried by heating at 90° C. for five minutes. After being dried by heating, curing was performed for 20 minutes at 210° C., and a solid lubricant coating layer was formed.

Test No. 3

In Test No. 3, finish machine grinding was performed on the pin surface and the box surface. Thereafter, a composition for solid lubricant coating layer formation was applied to the pin surface and the box surface. The composition for solid lubricant coating layer formation contained an epoxy resin (balance), PTFE particles (19.9%), $Cr_2O_3$ particles (15.5%), and a solvent (water, alcohol, and a surfactant). The composition for solid lubricant coating layer formation was applied by spraying, and thereafter was dried by heating at 90° C. for five minutes. After being dried by heating, curing was performed for 20 minutes at 210° C., and a solid lubricant coating layer was formed.

Test No. 4

In Test No. 4, surface roughness was formed on the pin surface by a blasting process. The pin surface having surface roughness was subjected to Zn—Ni alloy plating by electroplating to form a Zn—Ni alloy plating layer thereon. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 $A/dm^2$, and a treatment time of 18 minutes. The Zn—Ni alloy plating layer had a composition of Zn: 85% and Ni: 15%. Furthermore, a trivalent chromating treatment was performed on the obtained Zn—Ni alloy plating layer. The trivalent chromating treatment solution used was DAIN Chromate TR-02 (trade name) manufactured by Daiwa Fine Chemicals Co., Ltd. The trivalent chromating treatment was performed under conditions of a bath pH of 4.0, a bath temperature of 25° C., and a treatment time of 50 seconds.

Finish machine grinding was performed on the box surface. Thereafter, a composition for solid lubricant coating layer formation was applied to the box surface. The composition for solid lubricant coating layer formation contained an epoxy resin (balance), PTFE particles (10.3%), $Cr_2O_3$ particles (19.2%), and a solvent (water, alcohol, and a surfactant). The composition for solid lubricant coating layer formation was applied by spraying, and thereafter was dried by heating at 90° C. for five minutes. After being dried by heating, curing was performed for 20 minutes at 210° C., and a solid lubricant coating layer was formed.

Test No. 5

In Test No. 5, surface roughness was formed on the pin surface by a blasting process. The pin surface having surface roughness was subjected to Zn—Ni alloy plating by electroplating to form a Zn—Ni alloy plating layer thereon. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 $A/dm^2$, and a treatment time of 18 minutes. The Zn—Ni alloy plating layer had a composition of Zn: 85% and Ni: 15%. Furthermore, a trivalent chromating treatment was performed on the obtained Zn—Ni alloy plating layer. The trivalent chromating treatment solution used was DAIN Chromate TR-02 (trade name) manufactured by Daiwa Fine Chemicals Co., Ltd. The trivalent chromating treatment was performed under conditions of a bath pH of 4.0, a bath temperature of 25° C., and a treatment time of 50 seconds.

Surface roughness was formed on the box surface by a blasting process. The box surface having surface roughness was subjected to Zn—Ni alloy plating by electroplating to form a Zn—Ni alloy plating layer thereon. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 $A/dm^2$, and a treatment time of 18 minutes. The Zn—Ni alloy plating layer had a composition of Zn: 85% and Ni: 15%. Furthermore, a composition for solid lubricant coating layer formation was applied to the obtained Zn—Ni alloy plating layer. The composition for solid lubricant coating layer formation contained a polyamide-imide resin (balance), PTFE particles (15.3%), $Cr_2O_3$ particles (16.7%), and a solvent (water, alcohol, and a surfactant). The composition for solid lubricant coating layer formation was applied by spraying, and thereafter was dried by heating at 90° C. for five minutes. After being dried by heating, curing was performed for 20 minutes at 230° C., and a solid lubricant coating layer was formed.

Test No. 6

In Test No. 6, finish machine grinding was performed on the pin surface. Thereafter, Zn—Ni alloy plating was performed by electroplating to form a Zn—Ni alloy plating layer on the pin surface. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 A/dm$^2$, and a treatment time of 18 minutes. The Zn—Ni alloy plating layer had a composition of Zn: 85% and Ni: 15%. Furthermore, a trivalent chromating treatment was performed on the obtained Zn—Ni alloy plating layer. The trivalent chromating treatment solution used was DAIN Chromate TR-02 (trade name) manufactured by Daiwa Fine Chemicals Co., Ltd. The trivalent chromating treatment was performed under conditions of a bath pH of 4.0, a bath temperature of 25° C., and a treatment time of 50 seconds.

Surface roughness was formed on the box surface by a blasting process. The box surface having surface roughness was subjected to Zn—Ni alloy plating by electroplating to form a Zn—Ni alloy plating layer thereon. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 A/dm$^2$, and a treatment time of 18 minutes. The Zn—Ni alloy plating layer had a composition of Zn: 85% and Ni: 15%. Furthermore, a composition for solid lubricant coating layer formation was applied to the obtained Zn—Ni alloy plating layer. The composition for solid lubricant coating layer formation contained a phenol resin (balance), PTFE particles (20.0%), Cr$_2$O$_3$ particles (10.0%), and a solvent (water, alcohol, and a surfactant). The composition for solid lubricant coating layer formation was applied by spraying, and thereafter was dried by heating at 90° C. for five minutes. After being dried by heating, curing was performed for 20 minutes at 230° C., and a solid lubricant coating layer was formed.

Test No. 7

In Test No. 7, finish machine grinding was performed on the pin surface. Thereafter, Zn—Ni alloy plating was performed by electroplating to form a Zn—Ni alloy plating layer on the pin surface. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 A/dm$^2$, and a treatment time of 18 minutes. The Zn—Ni alloy plating layer had a composition of Zn: 85% and Ni: 15%. Furthermore, a trivalent chromating treatment was performed on the obtained Zn—Ni alloy plating layer. The trivalent chromating treatment solution used was DAIN Chromate TR-02 (trade name) manufactured by Daiwa Fine Chemicals Co., Ltd. The trivalent chromating treatment was performed under conditions of a bath pH of 4.0, a bath temperature of 25° C., and a treatment time of 50 seconds.

Surface roughness was formed on the box surface by a blasting process. The box surface having surface roughness was subjected to Cu—Sn—Zn alloy plating by electroplating to form a Cu—Sn—Zn alloy plating layer thereon. The Cu—Sn—Zn alloy plating bath used was a plating bath manufactured by NIHON KAGAKU SANGYO CO., LTD. The Cu—Sn—Zn alloy plating layer was formed by electroplating. The electroplating was performed under conditions of a plating bath pH of 14, a plating bath temperature of 45° C., a current density of 2 A/dm$^2$, and a treatment time of 40 minutes. The Cu—Sn—Zn alloy plating layer had a composition of Cu: 60%, Sn: 30% and Zn: 10%. Furthermore, a composition for solid lubricant coating layer formation was applied to the obtained Cu—Sn—Zn alloy plating layer. The composition for solid lubricant coating layer formation contained a polyamide resin (balance), graphite particles (5%), Cr$_2$O$_3$ particles (8%), and a solvent (water, alcohol, and a surfactant). The composition for solid lubricant coating layer formation was applied by spraying, and thereafter was dried by heating at 90° C. for five minutes. After being dried by heating, curing was performed for 20 minutes at 230° C., and a solid lubricant coating layer was formed.

Test No. 8

In Test No. 8, finish machine grinding was performed on the pin surface. Thereafter, Zn—Ni alloy plating was performed by electroplating to form a Zn—Ni alloy plating layer on the pin surface. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 A/dm$^2$, and a treatment time of 18 minutes. The Zn—Ni alloy plating layer had a composition of Zn: 85% and Ni: 15%. Furthermore, a trivalent chromating treatment was performed on the obtained Zn—Ni alloy plating layer. The trivalent chromating treatment solution used was DAIN Chromate TR-02 (trade name) manufactured by Daiwa Fine Chemicals Co., Ltd. The trivalent chromating treatment was performed under conditions of a bath pH of 4.0, a bath temperature of 25° C., and a treatment time of 50 seconds.

Surface roughness was formed on the box surface by a blasting process. Thereafter, Zn—Ni alloy plating was performed by electroplating to form a Zn—Ni alloy plating layer on the box surface. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 A/dm$^2$, and a treatment time of 18 minutes. The Zn—Ni alloy plating layer had a composition of Zn: 85% and Ni: 15%. Furthermore, a composition for solid lubricant coating layer formation was applied to the obtained Zn—Ni alloy plating layer. The composition for solid lubricant coating layer formation contained an epoxy resin (balance), PTFE particles (10.3%), and a solvent (water, alcohol, and a surfactant). The composition for solid lubricant coating layer formation was applied by spraying, and thereafter was dried by heating at 90° C. for five minutes. After being dried by heating, curing was performed for 20 minutes at 210° C., and a solid lubricant coating layer was formed.

Test No. 9

In Test No. 9, finish machine grinding was performed on the pin surface. Thereafter, Zn—Ni alloy plating was performed by electroplating to form a Zn—Ni alloy plating layer on the pin surface. The Zn—Ni alloy plating bath used was DAIN Zinalloy N-PL (trade name) manufactured by Daiwa Fine Chemicals Co., Ltd. The electroplating was performed under conditions of a plating bath pH of 6.5, a plating bath temperature of 25° C., a current density of 2 A/dm$^2$, and a treatment time of 18 minutes. The Zn—Ni alloy plating layer had a composition of Zn: 85% and Ni: 15%. Furthermore, a trivalent chromating treatment was performed on the obtained Zn—Ni alloy plating layer. The trivalent chromating treatment solution used was DAIN Chromate TR-02 (trade name) manufactured by Daiwa Fine Chemicals Co., Ltd. The trivalent chromating treatment was performed under conditions of a bath pH of 4.0, a bath temperature of 25° C., and a treatment time of 50 seconds.

Finish machine grinding was performed on the box surface. Thereafter, Zn—Ni alloy plating was performed by electroplating to form a Zn—Ni alloy plating layer on the box surface. The electroplating was performed under the same conditions as the conditions for the pin surface. A composition for solid lubricant coating layer formation was applied to the Zn—Ni alloy plating layer. The composition for solid lubricant coating layer formation contained an epoxy resin (balance), PTFE particles (10.4%), $Cr_2O_3$ particles (25.0%), and a solvent (water, alcohol, and a surfactant). The composition for solid lubricant coating layer formation was applied by spraying, and thereafter was dried by heating at 90° C. for five minutes. After being dried by heating, curing was performed for 20 minutes at 210° C., and a solid lubricant coating layer was formed.

Test No. 10

In Test No. 10, finish machine grinding was performed on the pin surface and the box surface. Thereafter, a composition for solid lubricant coating layer formation was applied to the pin surface and the box surface. The composition for solid lubricant coating layer formation contained an epoxy resin (balance), PTFE particles (20.1%), calcium fluoride particles (6.9%), and a solvent (water, alcohol, and a surfactant). The composition for solid lubricant coating layer formation was applied by spraying, and thereafter was dried by heating at 90° C. for five minutes. After being dried by heating, curing was performed for 20 minutes at 210° C., and a solid lubricant coating layer was formed.

Test No. 11

In Test No. 11, finish machine grinding was performed on the pin surface and the box surface. Thereafter, a dope according to the API standards was applied to the pin surface and the box surface by brushing. The term "dope according to the API standards" refers to compound grease for threaded connection for oil country tubular goods that is manufactured in accordance with API BUL 5 A2. It is defined that the composition of the dope according to the API standards adopts grease as a base material, and contains, in mass %, graphite powder: 18±1.0%, lead powder: 30.5±0.6%, and copper flake: 3.3±0.3%. Note that, it is understood that, within this component range, compound greases for threaded connection for oil country tubular goods have equivalent performance.

Galling Resistance Evaluation Test

Using the pins and boxes of Test No. 1 to Test No. 11, fastening was performed until threads intermeshed at an initial stage of fastening by hand tightening (state of fastening by human power). After the threads were fastened by hand tightening, fastening and loosening using a power tong were repeated, and the galling resistance was evaluated. Each time one cycle of fastening and loosening was completed, the pin surface and box surface were visually observed. The occurrence of galling was examined by visual inspection. When the galling was minor and was repairable, the galling flaws were corrected and the test was continued. The number of times that fastening and loosening could be performed without unrepairable galling occurring was measured. The results are shown in the "Galling Resistance (number of times (turns) fastening could be performed without galling)" column in Table 3.

TABLE 3

| Test No. | Over-torque Performance | Galling Resistance (number of times (turns) fastening could be performed without galling) |
|---|---|---|
| 1 | 120 | 15 |
| 2 | 127 | 15 |
| 3 | 138 | 15 |
| 4 | 140 | 12 |
| 5 | 143 | 13 |
| 6 | 141 | 11 |
| 7 | 125 | 13 |
| 8 | 74 | 10 |
| 9 | 151 | 10 |
| 10 | 68 | 6 |
| 11 | 100 | 8 |

Over-Torque Performance Test

Figure 7:
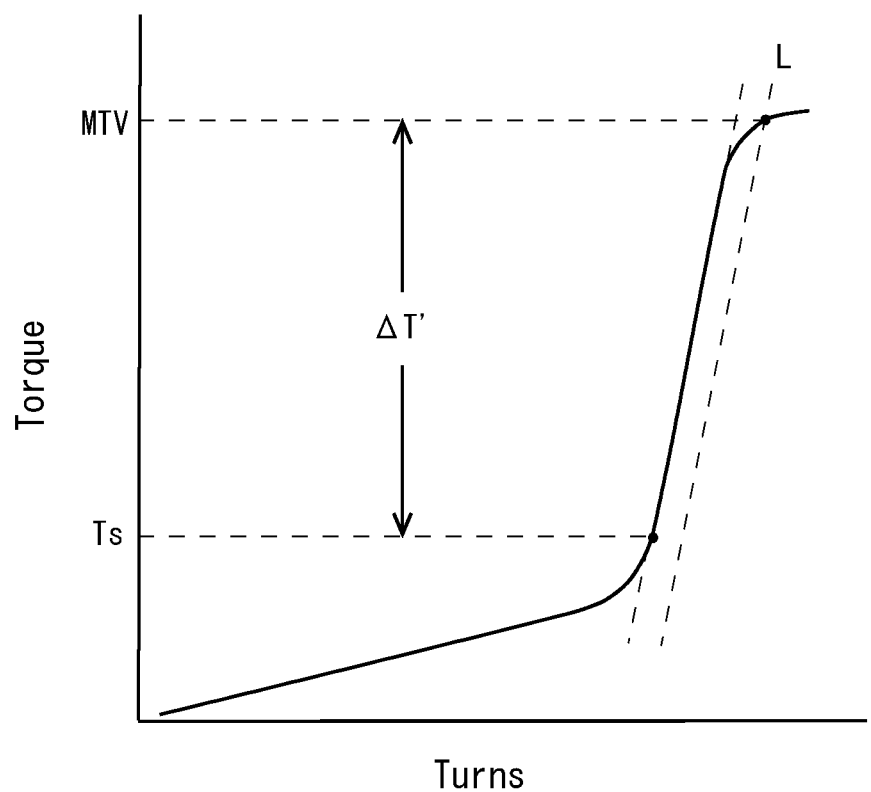
FIG. 7 is a graph for describing torque on shoulder resistance $\Delta T\square$ in an example.

Using the pins and boxes of Test No. 1 to Test No. 11, the torque on shoulder resistance ΔT□ was measured. Specifically, fastening was performed under conditions of a tightening speed of 10 rpm and a tightening torque of 42.8 kN·m. The torque at the time of fastening was measured, and a torque chart as illustrated in FIG. 7 was prepared. Reference characters "Ts" in FIG. 7 denote the shouldering torque. Reference characters "MTV" in FIG. 7 denote a torque value at which a line segment L and the torque chart intersect. The line segment L is a straight line that has the same slope as the slope of a linear region of the torque chart after shouldering, and for which the number of turns is 0.2% more in comparison to the aforementioned linear region. Normally, Ty (yield torque) is used when measuring the torque on shoulder resistance ΔT□. However, in the present example, the yield torque (boundary between a linear region and a non-linear region in the torque chart after shouldering) was indistinct. Therefore, MTV was defined using the line segment L. The difference between MTV and Ts was taken as the torque on shoulder resistance ΔT□ of the present example. The over-torque performance was determined as a relative value with respect to the torque on shoulder resistance ΔT□ of Test No. 11 where a dope according to the API standards was used instead of a solid lubricant coating layer as a reference (100). The results are shown in Table 3.

Evaluation Results

Referring to Table 1 to Table 3, the threaded connections for pipes or tubes of Test No. 1 to Test No. 7 and Test No. 9 had a solid lubricant coating layer on at least one of the contact surfaces of the pin and the box. The solid lubricant coating layer contained a resin, a solid lubricant powder and $Cr_2O_3$. Therefore, the over-torque performance was more than 100, and the threaded connections for pipes or tubes exhibited excellent over-torque performance.

In the threaded connections for pipes or tubes of Test No. 1 to Test No. 7, the content of $Cr_2O_3$ was 1.0 to 20.0 mass %. Therefore, the number of times fastening could be performed without galling was greater in comparison to the threaded connection for pipes or tubes of Test No. 9, and hence the galling resistance exhibited by the threaded connections for pipes or tubes of Test No. 1 to Test No. 7 was even more excellent than the galling resistance exhibited by the threaded connection for pipes or tubes of Test No. 9.

In contrast, although the threaded connection for pipes or tubes of Test No. 8 had a solid lubricant coating layer on the box surface, the solid lubricant coating layer did not contain $Cr_2O_3$. Therefore, the over-torque performance was low.

Although the threaded connection for pipes or tubes of Test No. 10 had a solid lubricant coating layer on the box surface, the solid lubricant coating layer contained calcium fluoride $CaF_2$, and not $Cr_2O_3$. Therefore, the over-torque performance was low.

The threaded connection for pipes or tubes of Test No. 11 did not have the solid lubricant coating layer of the present embodiment. Therefore, the over-torque performance was low.

An embodiment of the present invention has been described above. However, the foregoing embodiment is merely an example for implementing the present invention. Accordingly, the present invention is not limited to the above embodiment, and the above embodiment can be appropriately modified within a range which does not deviate from the gist of the present invention.

REFERENCE SIGNS LIST

1: Threaded connection for pipes or tubes
4: Male threaded portion
5: Pin
7: Female threaded portion
8: Box
6, 9: Contact surface
10, 13: Metal seal portion
11, 12: Shoulder portion
21: Solid lubricant coating layer

The invention claimed is:

1. A threaded connection for pipes or tubes comprising a pin and a box,
the pin and the box each comprising a contact surface having a threaded portion and an unthreaded metal contact portion,
the threaded connection for pipes or tubes comprising a solid lubricant coating layer on at least one of the contact surfaces of the pin and the box,
and the solid lubricant coating layer containing:
one or more types of resin selected from the group consisting of epoxy resin, phenol resin, polyamide-imide resin, and polyamide resin in a range of 60.0 to 90.0 mass %,
one or more types of solid lubricant powder selected from the group consisting of graphite and polytetrafluoroethylene in a range of 5.0 to 25.0 mass %, and
$Cr_2O_3$ in a range of 5.0 to 19.2 mass %.

2. A method for producing the threaded connection for pipes or tubes according to claim 1, comprising the steps of:
applying a composition containing the one or more types of resin selected from the group consisting of epoxy resin, phenol resin, polyamide-imide resin, and polyamide resin in a range of 60.0 to 90.0 mass %, the one or more types of solid lubricant powder selected from the group consisting of graphite and polytetrafluoroethylene in a range of 5.0 to 25.0 mass % and 5.0 to 19.2 mass % of the $Cr_2O_3$ to at least one of the contact surfaces of the pin and the box; and
solidifying the composition applied to the contact surface to form a solid lubricant coating layer.

3. The method for producing the threaded connection for pipes or tubes according to claim 2, the method further comprising the step of:
before applying the composition,
forming a Zn alloy plating layer by electroplating on at least one of the contact surfaces of the pin and the box.

4. The method for producing the threaded connection for pipes or tubes according to claim 3, the method further comprising the step of:
before forming the Zn alloy plating layer,
forming surface roughness on at least one of the contact surfaces of the pin and the box.

* * * * *